United States Patent [19]

Middleton

[11] Patent Number: 4,956,947
[45] Date of Patent: Sep. 18, 1990

[54] LIVE TENDON SYSTEM INHIBITING SWAY OF HIGH RISE STRUCTURES AND METHOD

[76] Inventor: Leonard E. Middleton, 2907 N. 22nd Ave. W., Duluth, Minn. 55811

[21] Appl. No.: 422,043

[22] Filed: Oct. 16, 1989

Related U.S. Application Data

[63] Continuation-in-part of Ser. No. 176,083, Apr. 1, 1988, abandoned.

[51] Int. Cl.$^5$ .............................................. E02D 27/34
[52] U.S. Cl. ...................................... 52/1; 52/167 DF
[58] Field of Search ........................ 52/1, 167 DF, 167

[56] References Cited

U.S. PATENT DOCUMENTS

| | | | |
|---|---|---|---|
| 3,538,659 | 11/1970 | McDermott | 52/236 |
| 3,606,713 | 9/1971 | Runquist | 52/1 |
| 3,796,017 | 3/1974 | Meckler | 52/167 DF |
| 4,011,694 | 3/1977 | Langford | 52/1 |
| 4,325,654 | 4/1982 | Meckler | 52/167 DF |
| 4,429,496 | 2/1984 | Masri | 52/167 DF |
| 4,766,706 | 8/1988 | Caspe | 52/167 DF |
| 4,799,339 | 1/1989 | Kobori | 52/167 DF |

Primary Examiner—Henry E. Raduazo
Attorney, Agent, or Firm—Leo Gregory

[57] ABSTRACT

A steady beam is focused upon a target member located on a building structure. The target member moves with the deflection of the building structure and the movement of the target is communicated to a programmed controller which responds to the movement indicated by actuating tension adjusting members which are connected to an array of elastic steel rod-like tendons disposed adjacent the structure's main support members. The tension adjusting members are caused to apply tensile force to the tendons to counter the force causing the deflection of the structure and to inhibit the effect of the force on the structure's support members, thus diminishing the extent of deflection and dampening the oscillation of the structure which is incident to the restoration of the structure to a condition of equilibrium.

16 Claims, 10 Drawing Sheets

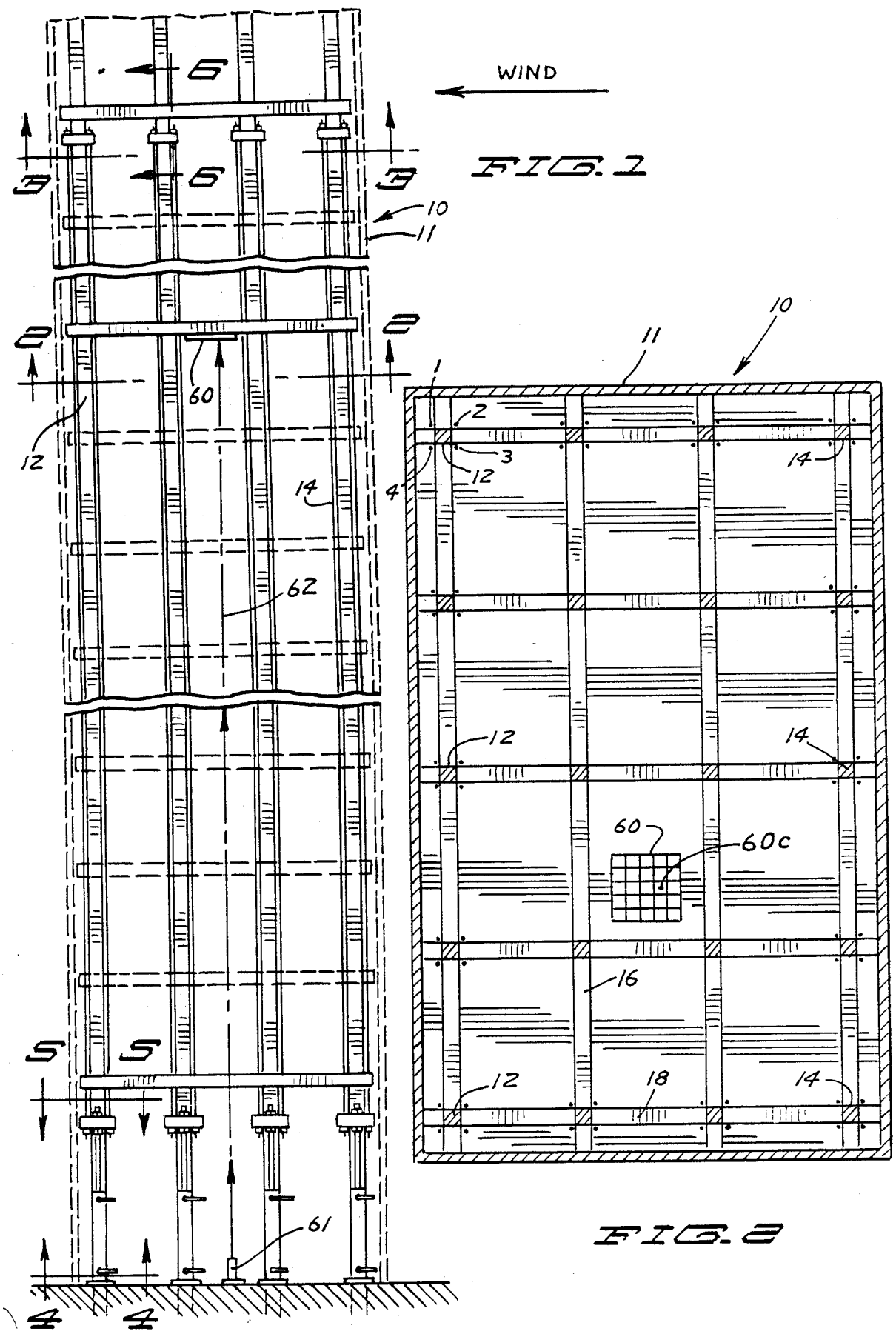

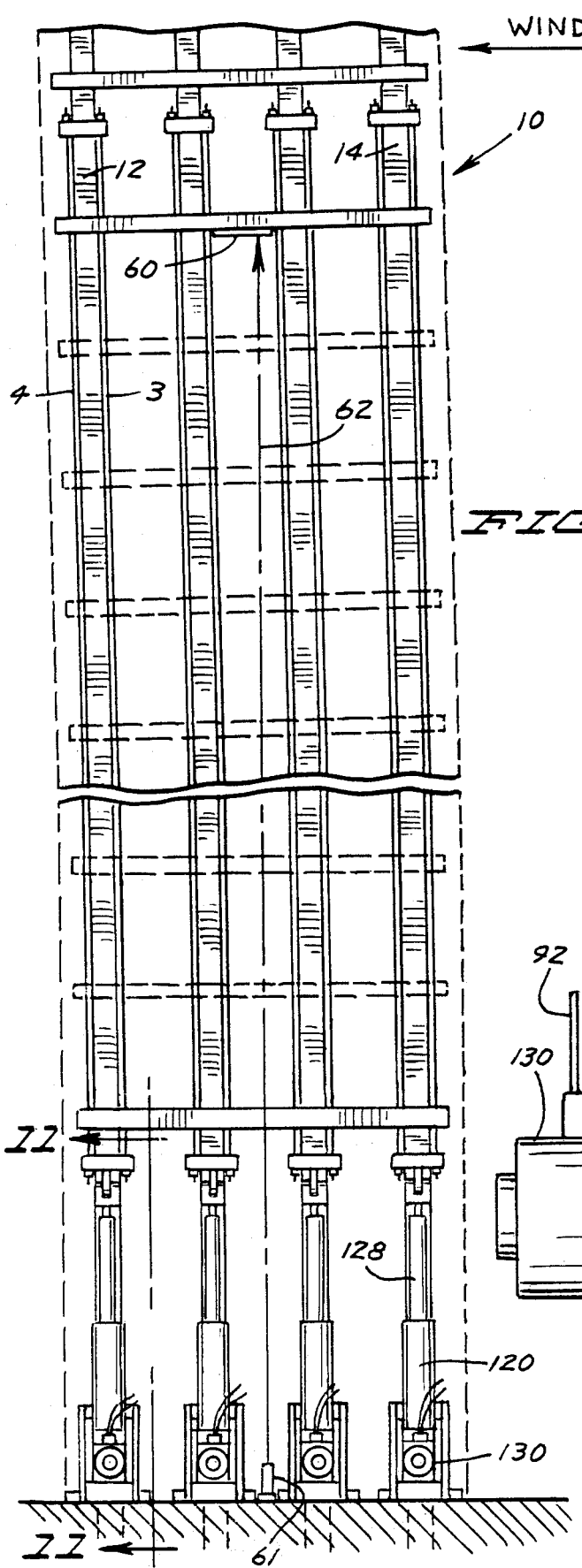
*FIG. 10*
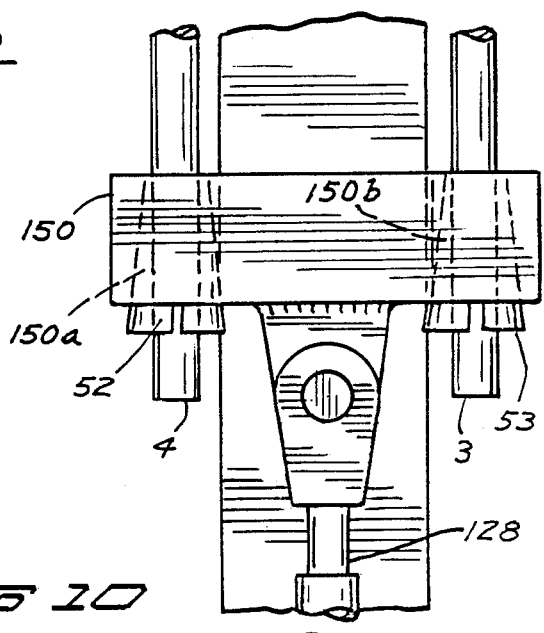
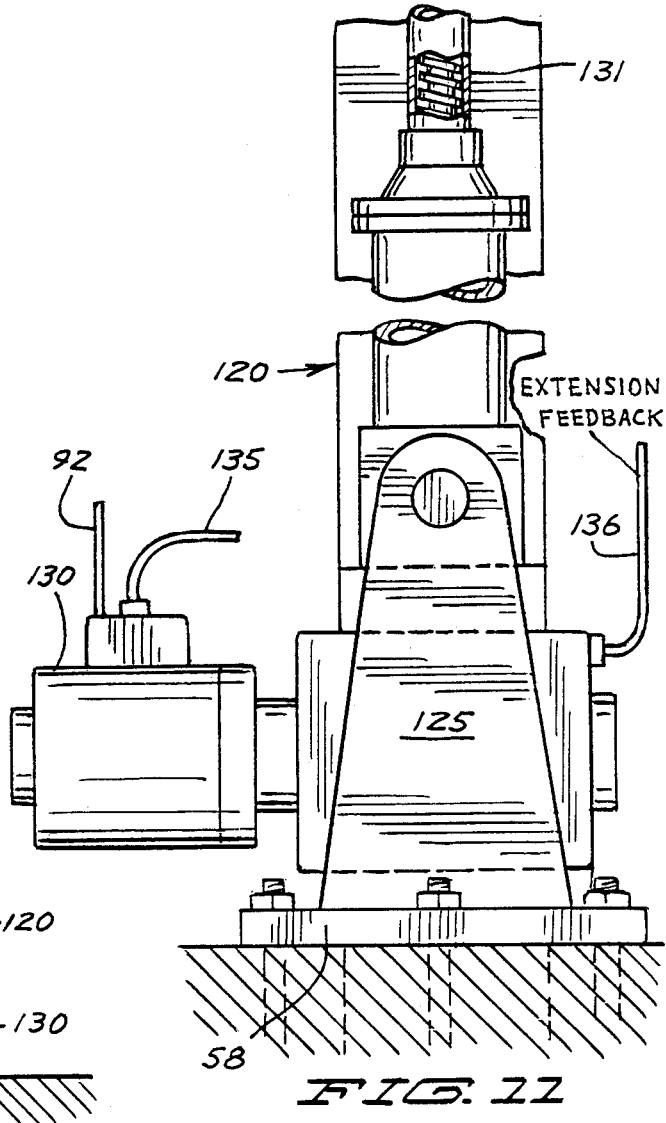
*FIG. 22*

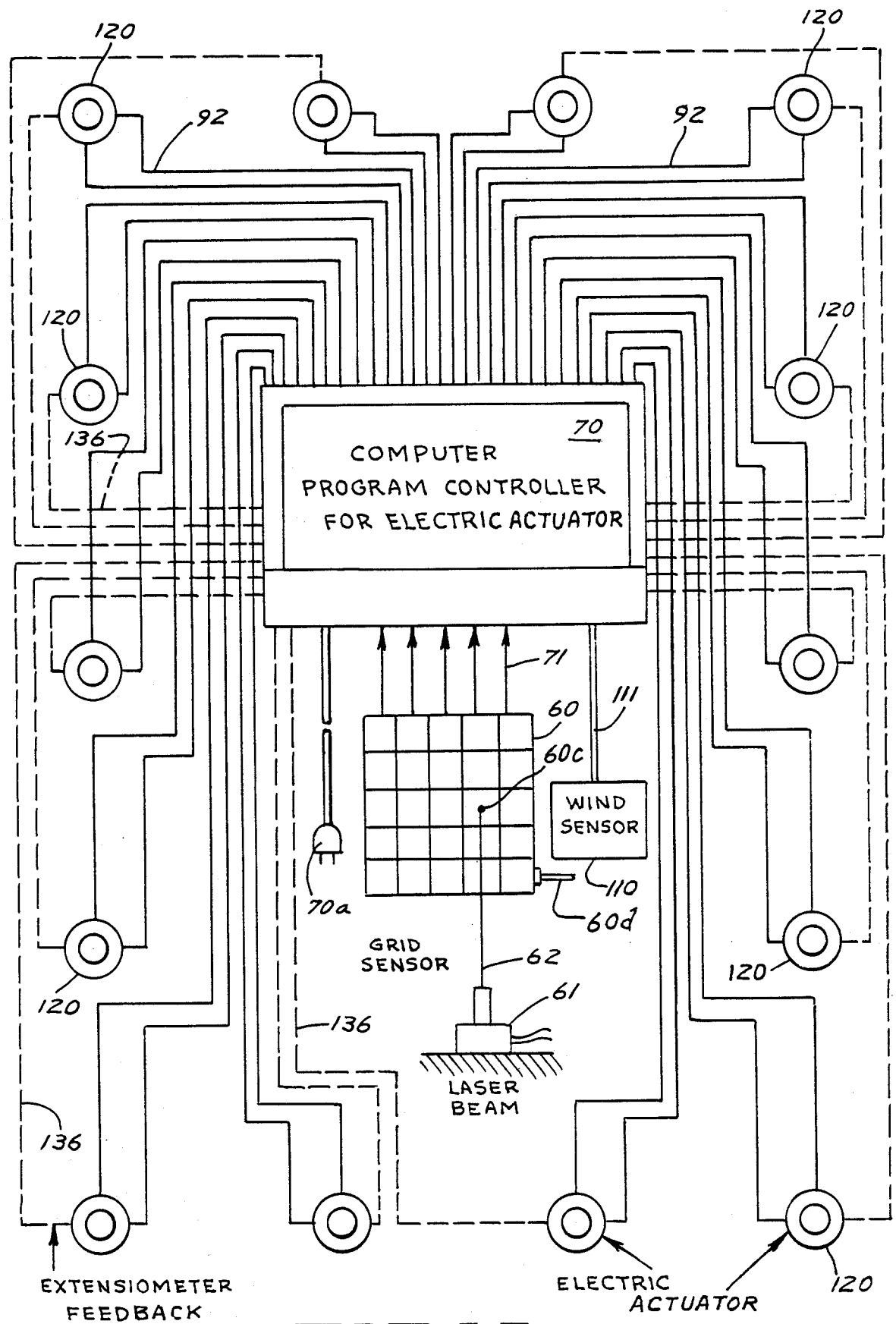

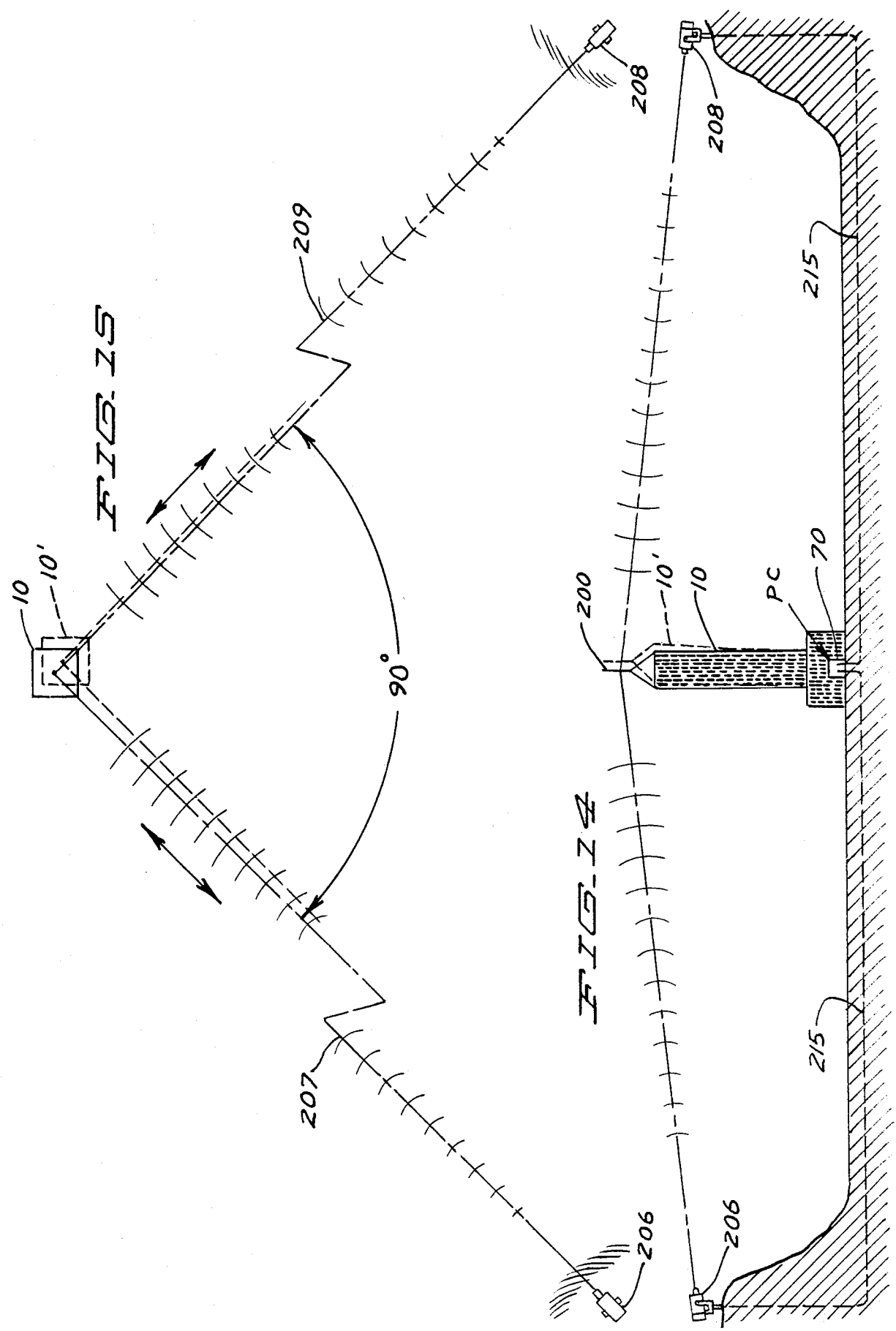

ately tall buildings can sway up to several feet in the face of a heavy wind such as one of gale proportions. Even at a lesser wind velocity, there may be sufficient sway as to make the occupants of a structure feel queasy.

LIVE TENDON SYSTEM INHIBITING SWAY OF HIGH RISE STRUCTURES AND METHOD

This is a continuation-in-part of application co-pending application Ser. No. 176,083 filed Apr. 1, 1988.

BACKGROUND OF INVENTION

1. Field of Invention

This invention relates to a system to counter the effect of the wind to sway a high rise structure and to dampen oscillation in restoring equilibrium to the structure.

2. Brief Description of the Prior Art

There is a good deal of interest in the construction of supertall or high rise structures, such as office buildings, to heights as from 150 to 200 stores or more and considerable attention is focused upon the control of wind sway of such structures and of the dampening of the resulting oscillation.

With reference to the prior art, E. A. Proctor in his U.S. Letters Pat. No. 3,232,012 discloses the use of a slack cable across the side of a building which carries a weight which will be caused to fall by a severe wind until the slack in the cable is taken up and the cable becomes a taut brace.

J. F. McDermott in his U.S. Letters Pat. No. 3,538,659 shows the use of steel columns about a building supporting horizontal struts to cause the building to resist bending and swaying.

Milton Meckler in his U.S. Letters Pat. No. 3,796,017 shows the use of tubular structural elements filled with fluid under hydraulic distributions to absorb lateral and vertical shocks and to stiffen the structure elements.

F. E. Langford in his U.S. Letters Pat. No. 4,011,694 discloses a guy wire supported tower using a hydraulic assembly to operate pistons to alter the length of the guys to prevent tension from exceeding the load bearing strength of a guy.

E. M. Runquist in his U.S. Pat. No. 3,606,713 relates to a tubular mast held steady by guy wires from its mast-top and played out by a take up reel remotely controlled. A tilt of the mast is indicated by surrounding photo sensitive materials which indicate direction of tilt and when vertical a central cell generates a signal. A remote operator mans a remote winch to adjust the guys to make the mast erect.

S. F. Masri in his U.S. Letters Pat. No. 4,429,496 relates to reducing the vibration of a structure when subjected to transient forces by use of a sensor in circuit with a pulse generator which produces a unilateral directional thrust to limit vibration stress in reaction to shock to disorganize or dampen harmonic motion.

The above listed patents appear to be representative of the patented art in regard to the wind sway control of structures.

SUMMARY OF THE INVENTION

This invention in connection with high rise structures represents a system for improvement in reducing substantially the amount of structural or building material which would otherwise be required to stiffen a structure in an effort to inhibit wind induced sway and to dampen the oscillatory effect of the sway in restoring the structure to a state of equilibrium.

For any high rise structure such as an office tower of eighty stories or more in height and as well for structures of forty stories or more, the most important challenge facing the structural designer or builder is to inhibit wind induced sway of the structure as sufficiently tall buildings can sway up to several feet in the face of a heavy wind such as one of gale proportions. Even at a lesser wind velocity, there may be sufficient sway as to make the occupants of a structure feel queasy.

A high rise structure may be stiffened by structural design by the use of more material in the structural support system and bracing, but this increases substantially the cost of construction.

It is an object of this invention to provide for the erection of a high rise structure with the use of less construction material than would otherwise be required to stabilize the structure against wind sway with means to instantly generate forces opposed to the swaying forces of wind to both inhibit the sway of the structure and to dampen the rate of oscillation which accompanies the sway in the restoration of equilibrium to the structure.

It is another object of this invention to provide sway detection apparatus which detects the extent and direction of the sway and actuates opposing forces to inhibit the sway.

It is also an object of this invention to install an array of live tendons integral with a structure and in connection therewith means detecting and measuring the extent of sway, said means causing tensile forces to be applied to selected tendons adjacent to the main structural members which maintain the structure's stability so as to offset the effect of the force of wind and to diminish the deflection or sway which would otherwise be experienced by the structure and to reduce the rate and extent of the oscillation of the structure as this invention strives to achieve equilibrium and cessation of movement in the structure.

More specifically it is an object of this invention to provide an array of high strength rods forming tendons along the main framing members of a structure and together with actuating means of which one application may be a steady beam focused upon a grid of sensors which sways with the structure relative to the beam, thus signaling the extent of the sway to a computer which causes opposing forces to be applied to appropriate tendons to increase the resistance of the structure to the force of the wind and as the wind subsides, the structure becomes restored to its normal position, and said means dampens the oscillation which results from the sway and from the effort to equalize the inertial forces built up to restore the structure to a condition of equilibrium.

It is the purpose of the invention to develop and apply countering forces which resist and slow the lateral movement of a tall structure by retarding the increase of tensile forces in any selected support member and/or the resultant rate of loss of compressive forces in those support members whose resultant change in length significantly affects the lateral movement of the structure. To slow, retard or minimize these length changes and the rate of such changes in a timely manner diminishes the total deflection and increases the cycle time required for a structure to undergo its range of movement.

It is not the extent of lateral movement or deflection of a structure which is particularly objectionable but what is objectionable are the humanly perceptible rates of acceleration and deceleration as the structure oscillates. Hence if the movement of the structure is retarded, a longer time will be required for each oscillation cycle which thus makes less perceptible the acceleration and deceleration thereof. Thus the oscillation is made not to upset the comfort of the occupants of the structure.

A significant economic advantage is obtained through the application of the live tendon sway control system herein indicated as this system uses substantially less structural materials than would otherwise be required merely for such stiffness as to resist an unsafe extent of wind sway and thus makes more feasible the construction of taller structures, by reducing weight and thus reducing foundation costs and requiring a lesser area of land use as a base to construct a structure to its desired height.

Although it would appear that the principal application herein would be in connection with the office or apartment buildings, the application is pertinent to various high rise or extended structures including bridge spans. The support members which are stiffened or reinforced herein may be columns, beams, walls and various types of bracing members.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a broken view in elevation of a detail of the structure;

FIG. 2 is a view in horizontal section taken on line 2—2 of FIG. 1 as indicated;

FIG. 10 is a view similar to FIG. 1, showing a modification;

FIG. 11 is a view on an enlarged scale in vertical section taken on line 11—11 of FIG. 10 as indicated;

FIG. 12 is a schematic view of the circuitry in connection with electric actuators;

FIG. 14 is a view in elevation; with an alternate position shown in dotted line; and FIG. 15 is a top plan view showing an alternate position in dotted line.

DESCRIPTION OF A PREFERRED EMBODIMENT

The system herein is described in connection with one type of a tall building framing concept. The concept herein is one which relies principally on the exterior wall columns for resistance to lateral forces and is referred to as a tubular type of construction. It is to be noted that the system is also applicable to various high rise and extended structures, other than buildings, which are subject to wind sway or deflection.

Figure 3:
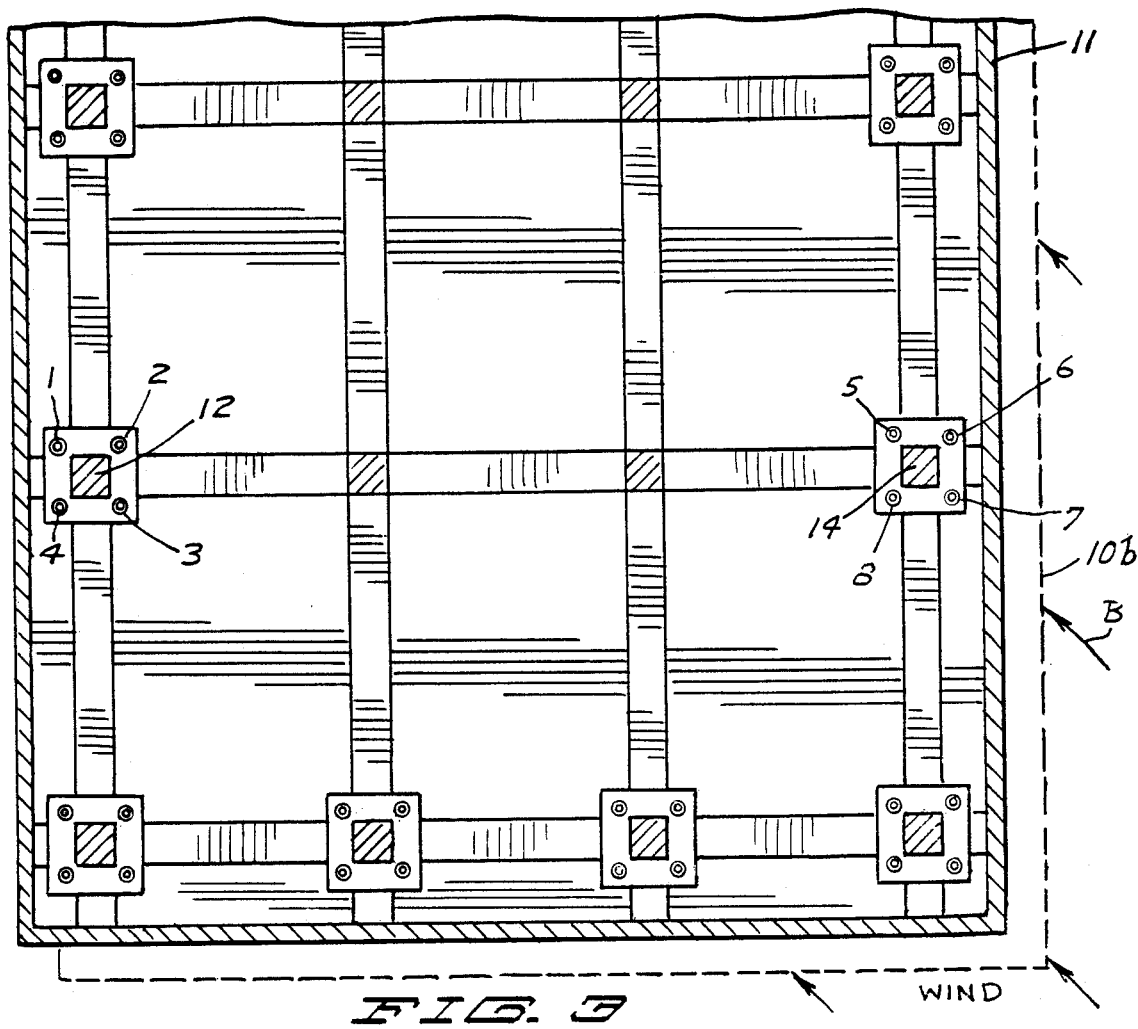
FIG. 3 is a view in horizontal section similar to FIG. 2 taken on line 3—3 of FIG. 1 as indicated.

Referring to the Figs., in FIG. 2, the construction of a high rise building or structure 10, as here illustrated, which may be made of steel and/or of concrete members is represented by a rigid tubular steel framework which comprises vertical steel perimeter supporting or stabilizing frame members represented by the columns 12 and 14, said columns being secured in spaced relation by horizontal frame members or girders as by the girders 16 and 18 respectively extending across the length and width of the structure at each floor level. Thus the steel framework is assembled upon which the exterior walls 11 (FIG. 3) are supported in the manner of the conventional erection of such a structure. The particular structure described herein is for the purpose of illustration and not of limitation.

Now will be described the elements of structure which comprise the essential elements of the invention herein.

Figure 6:
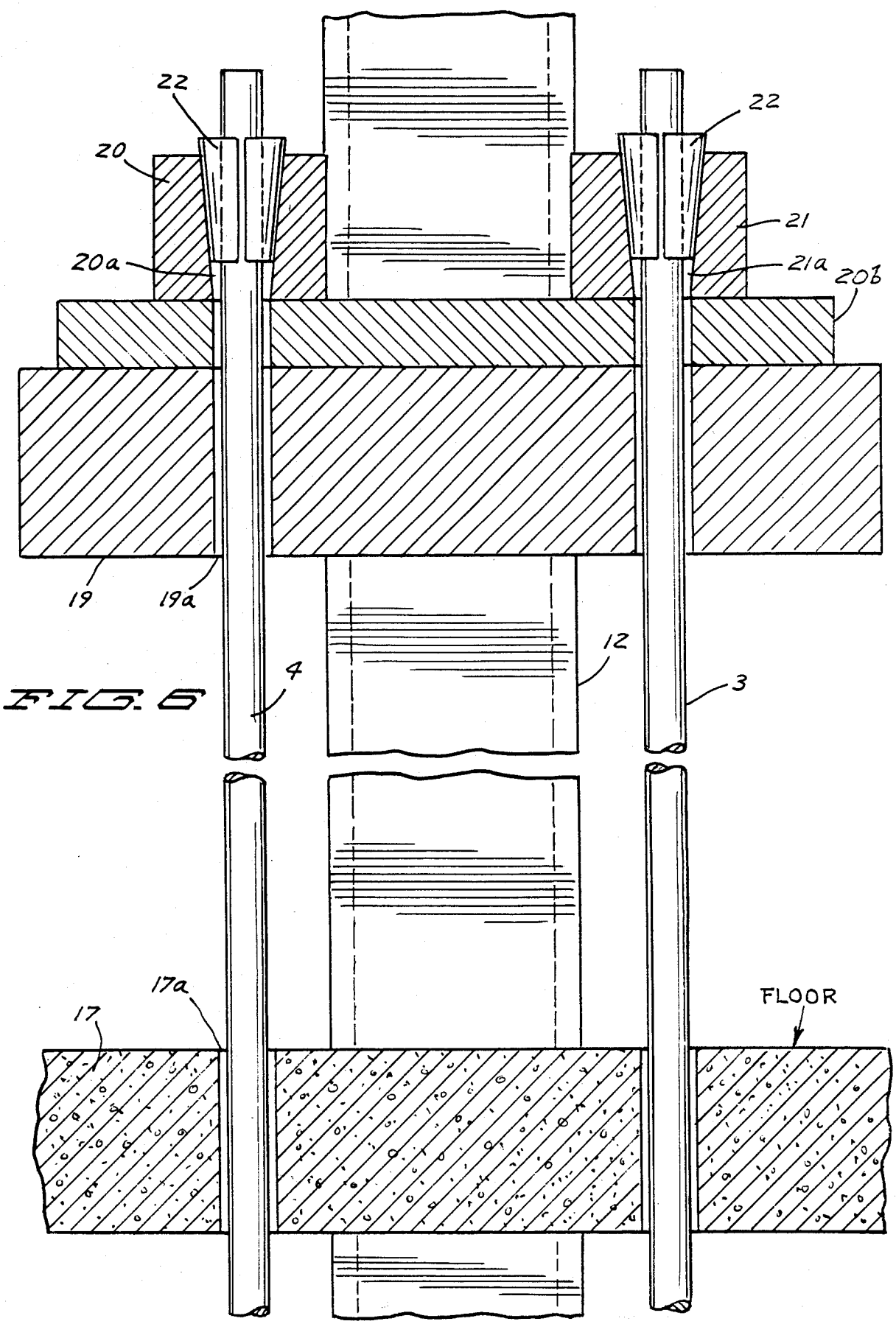
FIG. 6 is a view on an enlarged scale in vertical section showing a detail of a structure as taken on line 6—6 of FIG. 1.

Extending upwardly along each vertical perimeter supporting frame member or column represented by the columns 12 and 14 are solid elastic steel or other solid high strength elastic rods referred to herein as tendons. In the embodiment of the invention as here illustrated in FIG. 2, the tendons are arranged as represented by tendons 1,2,3, and 4 about the column 12 and the tendons 5,6,7 and 8 about the column 14. For the purpose of illustration, the tendons bearing the reference numerals indicated are selected to be at opposite sides of the structure and these tendons are representative of the remainder of the tendons embodied in the structure. At each floor level, the floors as represented by the floor 17 (FIG. 6), will have voids 17a therethrough adjacent each perimeter column for the passage of said tendons.

It is well to note here that the perimeter frame members may have internal voids and have a single tendon extending through said internal voids in lieu of the external tendons described and the treatment thereof will be in the manner of the tendons herein described.

It is well to note further that structures may have internal columns or walls to resist lateral forces such as the walls around the elevator shafts and if such walls are of poured concrete they may have voids therethrough to receive tendons or if internal walls are formed of X-braced steel columns, they may have tendons adjacent thereto to provide stiffening as described herein.

Referring to FIG. 1, the tendon 2 is shown in a preferred embodiment extending to less than the full height of the column 12. The tendons may extend to the full height of the structure or to various lesser heights for purposes herein or the tendons may extend to different heights with respect to different columns, all in accordance with the design of the structure. Tendons in the form of rods function only under tension and are made extending through said internal voids in lieu of the external tendons described and the treatment thereof will be in the manner of the tendons herein described.

It is well to note further that structures may have internal columns or walls to resist lateral forces such as the walls around elevator shafts and if such walls are of poured concrete they may have voids therethrough to receive tendons or if internal walls are formed of X-braced steel columns, they may have tendons adjacent thereto to provide stiffening as described herein.

Referring to FIG. 1, the tendon 2 is shown in a preferred embodiment extending to less than the full height of the column 12. The tendons may extend to the full height of the structure or to various lesser heights for purposes herein or the tendons may extend to different heights with respect to different columns, all in accordance with the design of the structure. Tendons in the form of rods function only under tension and are made of sufficiently high strength materials to function as here indicated.

Like elements to be described will bear like reference numerals.

Having determined the appropriate height for the tendons, a bracket 19 ( FIG.6), will be suitably secured as by welding, bolting or casting to each perimeter column adjacent the upper ends of said tendons and is shown having bores or voids 19a therethrough for the passage of said tendons. Supported on said bracket 19 is a bearing plate 20b supporting anchor plates 20 and 21. Said anchor plates respectively have wedge sockets 20a and 21a. The upper end portions of said tendons, such as tendons 3 and 4, pass through said sockets and are secured therein by wedges 22. Said tendons may be secured in other ways.

An assembly of electronic controlled hydraulic cylinders operating piston rods are next described herein as a suitable means for applying tension to or snubbing up the tendons. Other means may be utilized within the scope of this invention.

Figure 4:
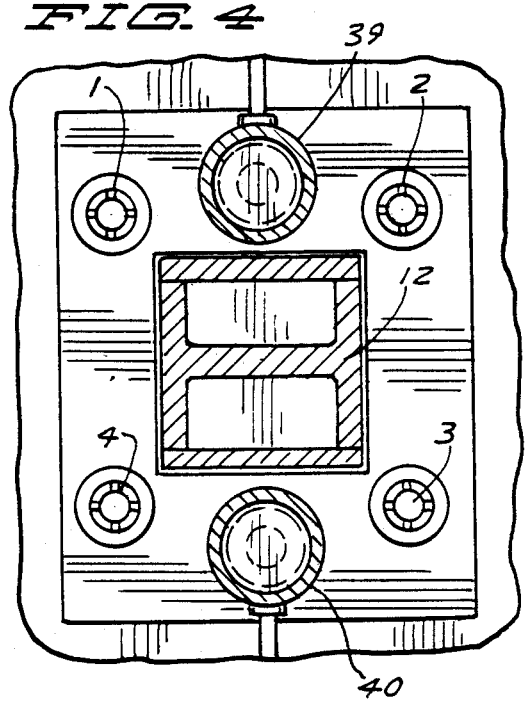
FIG. 4 is a view in cross section of a detail of structure taken on line 4—4 of FIG. 1 as indicated.
Figure 5:
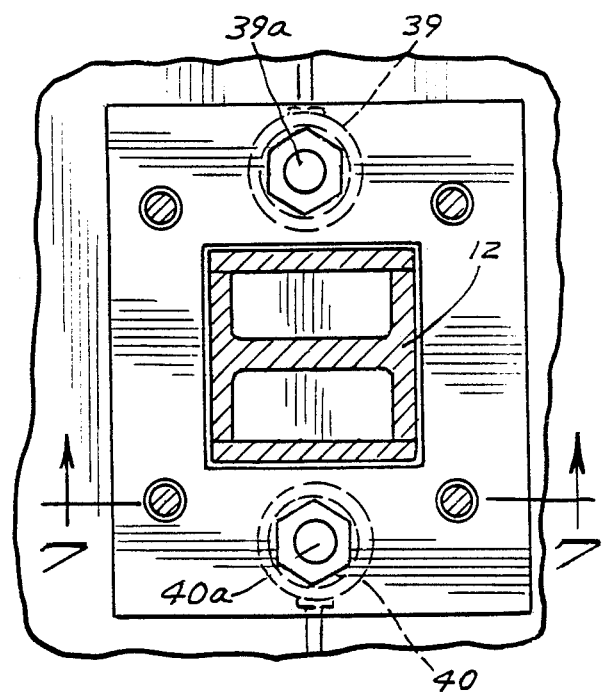
FIG. 5 is a view in horizontal section taken on line 5—5 of FIG. 1 as indicated.

As indicated in FIGS. 4 and 5, a pair of said cylinders such as 39 and 40, which are representative of all like cylinders herein, are positioned adjacent each perimeter column and said cylinders, as will be described, carry an anchor plate member to secure the lower ends of the tendons. The cylinder 40 will be described as a representative cylinder.

Figure 7:
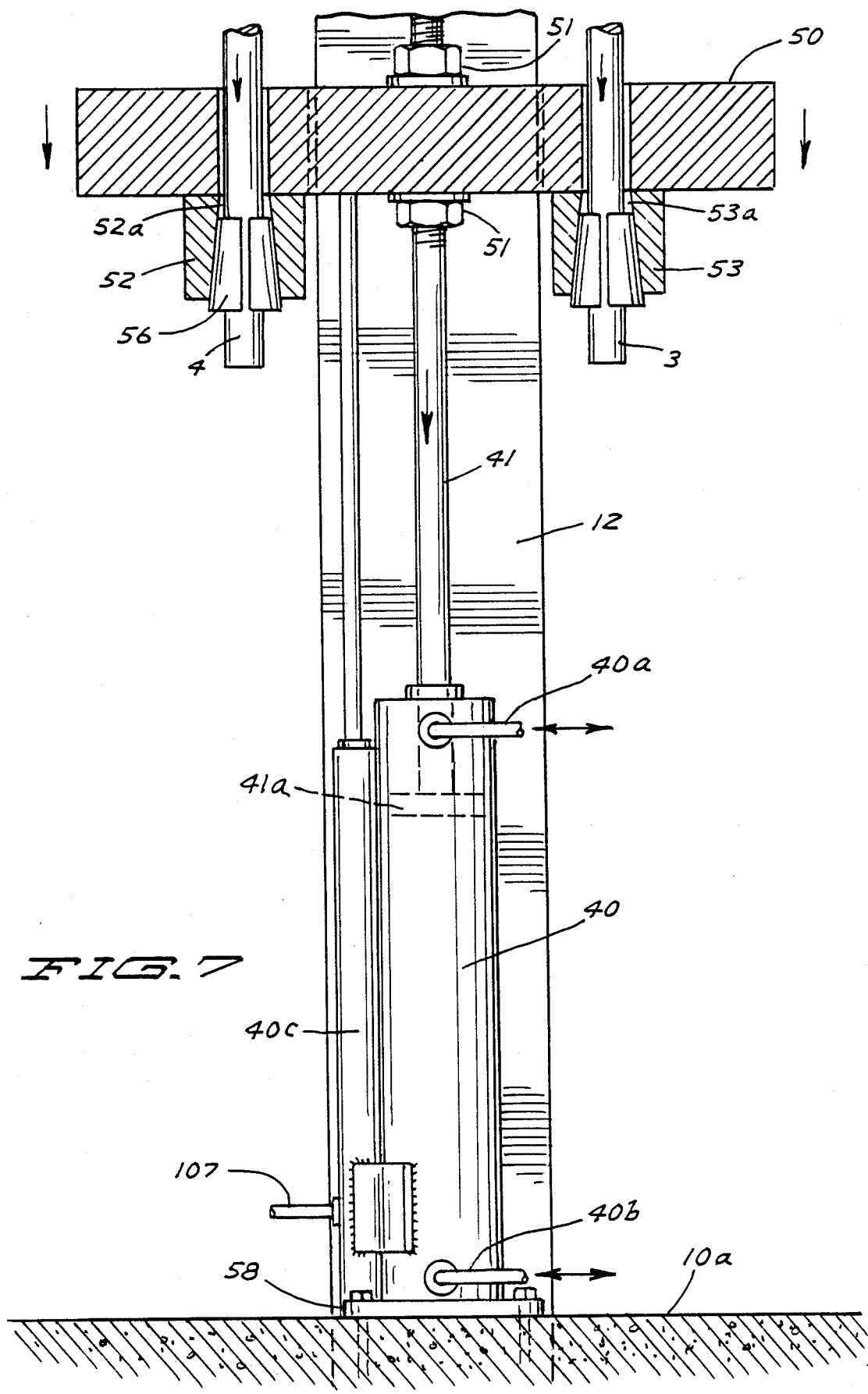
FIG. 7 is a view in vertical section taken on line 7—7 of FIG. 5 showing a detail of structure.
Figure 8:
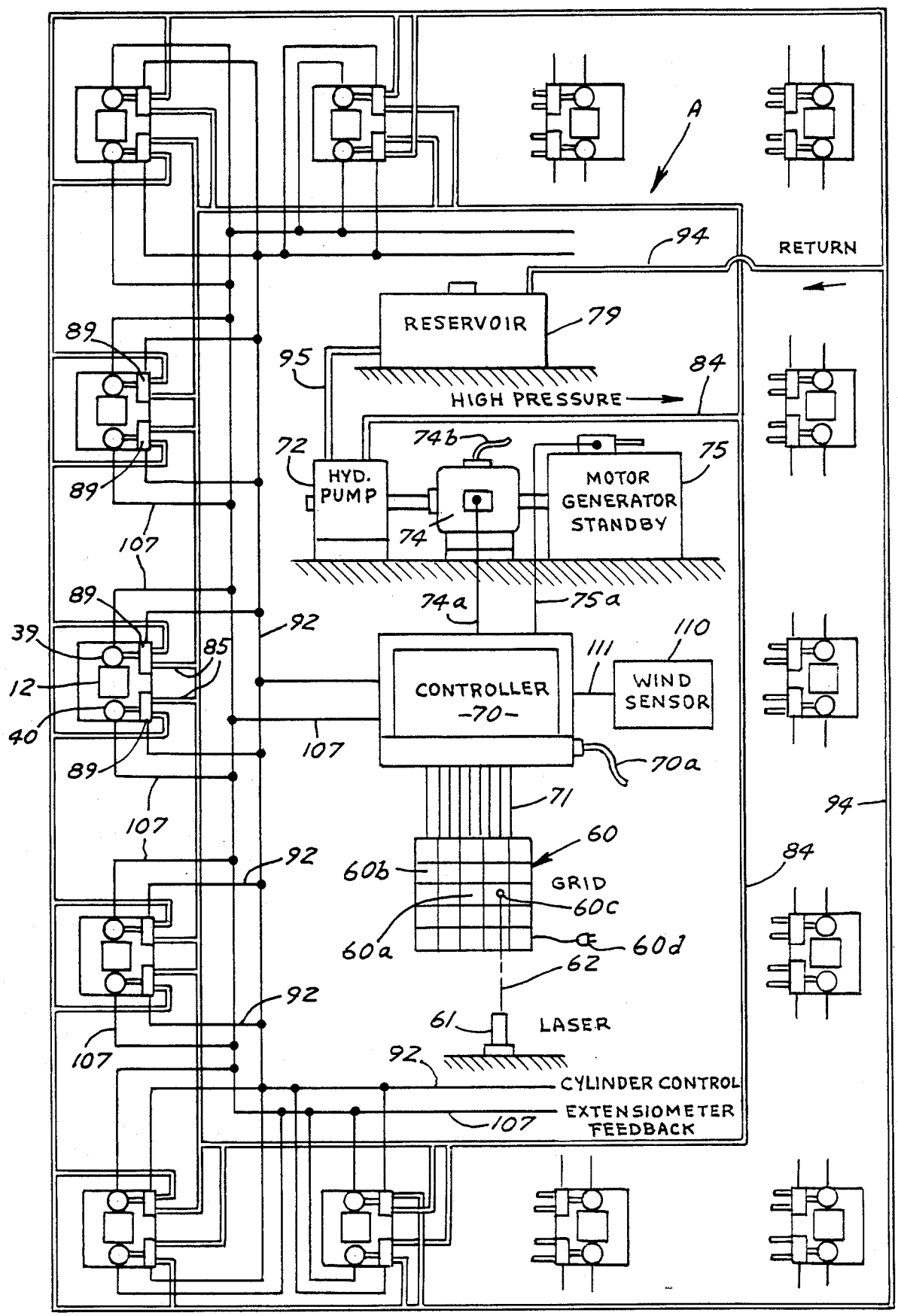
FIG. 8 is a schematic view of the electronic circuitry and of the hydraulic valve circuitry.
Figure 9:
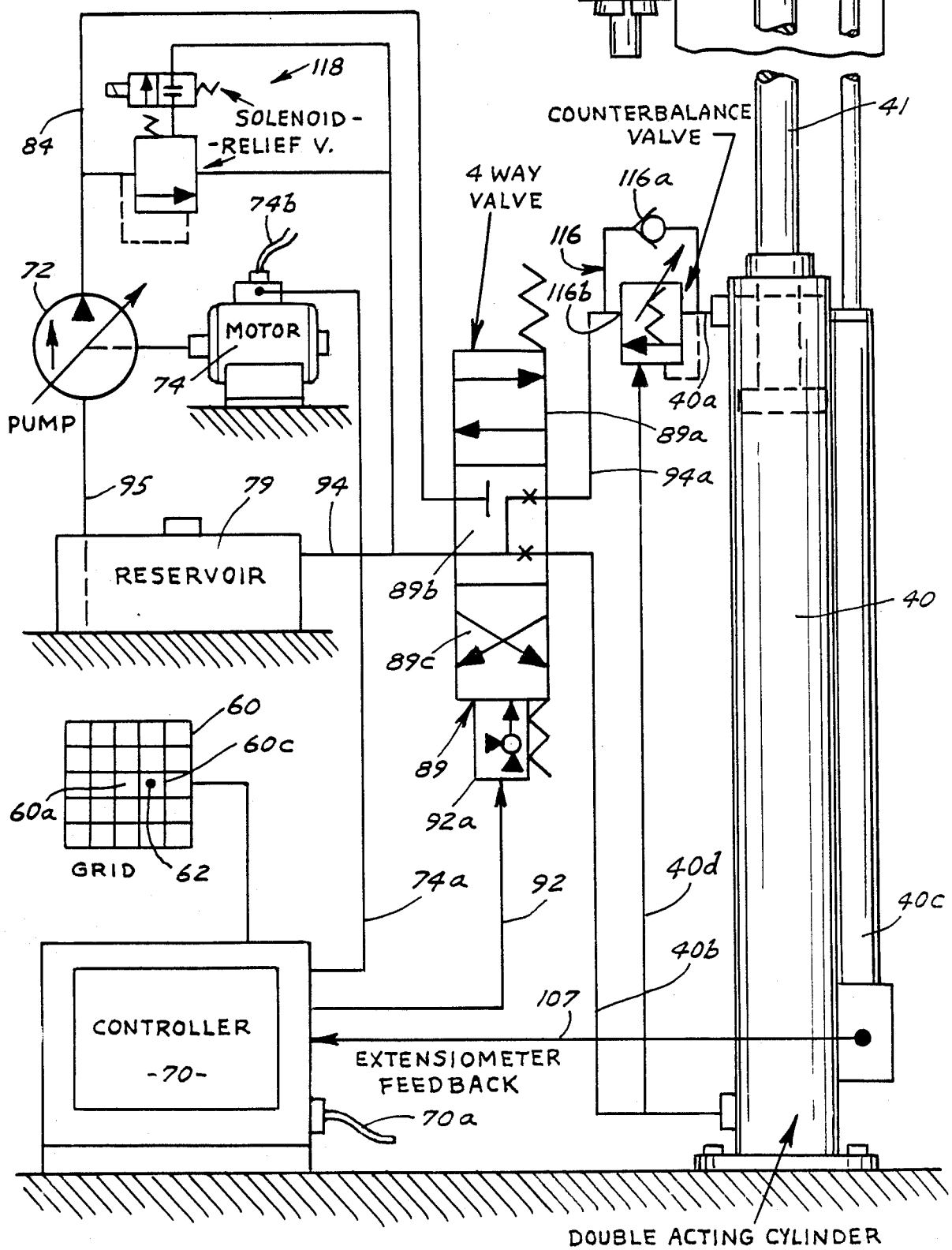
FIG. 9 is a schematic view of a valve control arrangement.

Referring to FIG. 7, said cylinder 40 will be preferably suitably anchored near the base 10a of the structure and said cylinder is shown here as a double action hydraulic cylinder having a rod 41 with a two-way line 40a above its piston head 41a and a two-way line 40b below said piston head. The cylinders herein are indicated as being similar to the type of computer controlled cylinders such as those made by Enerpac Division of Applied Power, Inc. of Butler, Wis. The control of all cylinders used is by means of a controller 70. An extensiometer 40c is indicated in FIG. 7 as being built into the cylinder to indicate the precise amount of extension or retraction of the rod thereof and the same is in an electrical circuit by line 107 with the controller 70 and included in said circuit intermediate said controller and each of said cylinders are proportional control valves 89 (FIGS. 8 and 9).

Extending upwardly of said cylinder is its piston rod 41 which, for purposes herein and as will be further described, will normally be in an extended position.

Mounted about the column 12 is a tendon anchor plate 50 which is representative of like anchor plates about each perimeter column. Each tendon anchor plate is carried by or secured to a pair of cylinders as shown in FIGS. 4 and 5 in connection with the cylinders 39 and 40.

To continue the description in connection with the cylinder 40 as shown in FIG. 7, the tendon anchor plate 50 is shown suitably secured by nuts 51 to the piston rod 41 of cylinder 40. Said plate is also likewise secured to the piston rods 39a of the cylinder 39 as indicated in FIG. 5. Said tendon anchor plate in FIG. 7 is shown having depending portions 52 and 53 thereunder which have wedge sockets 52a and 53a through which the tendons 3 and 4 extend downwardly to be secured therein by the wedge members 56 and 57. The plate member 50 is movable upwardly and downwardly relative to the column 12 by the piton rod 41.

Preferably the length of each tendon is pre-adjusted so that the entirety of each tendon is supported from its upper wedge fastening as a dead weight and a suitable tension may be placed thereon by its adjacent cylinder merely to assure that the tendons are straight and in a taut condition during a non-deflected state of equilibrium in the building structure.

Said cylinder 40 (FIG. 7), is here shown suitably secured to and supported by a tendon anchor plate member 58, all in a manner known in the art. Said cylinder may conveniently underlie the lowermost supporting frame member or may suitably be mounted and supported at any desired higher elevation.

Said cylinder 40 is shown having its piston rod in a normally sufficiently extended position to have adequate travel distance for the application of tension to the tendons as may be required and as will be further described.

The tendons herein described are elastic and what has been described relates to an arrangement of tendons into tension forces to be actuated to counteract the forces induced into the structure by wind. Depending on changes in the wind and the actual deflected position of the structure at any given instant, the arrangement by means of a programmed controller herein constantly reviews the external loads applied to the array of the tendons to promote equilibrium, diminish the degree of deflection of the structure, and to slow the rate of deflection and rebound or oscillation of the structure. The structure has a spring like characteristic and when deflected, strains to resume its normal vertical position which it does when the wind subsides. However, when the wind subsides, the structure does not resume its exact vertical position immediately but acts not unlike an inverted giant pendulum or sway pole and once in motion tends to keep oscillating until the various inertial forces affecting it are balanced. The purpose herein is to control wind force changes by both inhibiting the extent of deflection and slowing down the rate of oscillation.

The degree of stretch of a tendon is monitored by a controller by electronic feed back from the extensiometer used as represented by the extensiometer 40c. Other state of the art devices may be used such as flow meters measuring the volume of flow of hydraulic fluid or electronic load cells which measure applied pressure.

Next will be described the means to sense and measure the lateral movement of the structure such as deflection caused by wind sway.

Preferably within the structure, or related thereto, a sensor is installed which moves with or senses the lateral movement of the structure. The sensor may be variously positioned and in the present embodiment is shown suitably secured in position upwardly of the structure and having a clear passage there beneath. For purpose of illustration only and not for limitation, a graduated grid type sensor 60 is here indicated in which each increment of square 60b thereof has mounted therein a conventional light or energy sensitive cell not here shown. Said grid has a line 60d to a power source.

The grid is of a size such as to be adequate for a given structure and again for the purpose of illustration herein, said grid 60 is indicated, although not so shown, as being comprised of 169 squares of three inches each whereby the center of the center square 60a thereof is 19.5 inches from each side whereby the grid as here indicated could thus measure 3" increments up to a 19.5 inch off-center deflected position of the structure at the level of the sensor. Said center square may contain a sensitive cell engaged by a beam 62, to be described, to show that the system is operational or it may be a non-energized focus point for said beam.

Located preferably near the bottom of said structure is a fixed position light or energy source 61 of said beam 62, which for purpose of illustration, is indicated here as producing a laser beam. Said beam will be suitably energized in a conventional manner and will normally be focused upon or aligned with the center square 60a of said grid. The light sensitive cells of the grid upon respectively becoming engaged by said laser beam are activated to complete a circuit by lines 71 to a controller to be described. Said grid moves with the deflection or movement of the structure relative to the beam, and thus the cells of said grid are activated individually. The position of each cell is known to the controller as to its distance and direction from the position of the beam and this information is programmed into said controller. The controller knowing the distance each cell travels to become energized can calculate both the distance and rate of movement of the energized cells. Thus the rate and direction of movement and the distance of the deflection of the building structure is ascertained. In the event more than one cell is activated, the average distance of deflection would be calculated by the controller.

Operating the entire arrangement herein to detect the extent of deflection and changes in the extent of deflection of the structure by wind sway and to cause the application of appropriate countering forces to the system of tendons through the utilization of the electronically controlled hydraulic cylinders described is the computer or controller 70 here indicated as being a programmable controller. Various commercially available computers contain sufficient computational power to be utilized as the computer or controller 70 and to become fully programmed to cause to be made all of the computations necessary for producing the control signals required herein as described for every deflected position of the structure. Hence, implicit with reference to said controller is its capability to operate the arrangement herein.

A high rise structure under the force of wind behaves like a cantilever anchored at its foundation but free at the top. The support columns on the windward half of the structure lengthen to varying degrees from impact of wind induced tensile forces and those on the leeward half of the structure shorten to varying degrees under the added compression loads applied by wind force. Both steel and concrete are sufficiently flexible to sway and oscillate to an objectionable degree in a strong wind, as indicated by arrows B and dotted line 10b in FIG. 3.

As a guideline to prevent detectable rates of oscillation prior to utilization of the invention herein, a tall building should have been made to be stiff enough not to sway more than 1/400th of its height under a wind velocity of 95 m.p.h. Such a wind velocity represents a wind power of 30 p.s.f. Thus this guideline indicates the deflection of a 1000 foot building at its top should not exceed 2½ feet in order to avoid discomfort to the occupants. The period of oscillation is more critical than the extent of the sway, the oscillation being like the movement of an inverted pendulum. For example, it is known that the World Trade Center in New York City has a height of 1400 feet and is said to have a maximum deflection of 3½ feet and an oscillation period of eleven seconds per cycle of movement. The rate or speed of each cycle more adversely affects occupants than the distance of the movement.

As a high rise structure deflects to endure the force of a strong wind, and as such lateral movement comes momentarily to a stop at the end of its sway, first there is a deceleration and then there is an acceleration as the structure endeavors to move back to its vertical position until the wind again reverses the direction of building movement. In its maximum deflected position, the columns on the windward half of the structure can be stretched out sufficiently to be transformed into tension members to various degrees in trying to pull the structure back to its normal vertical position and the columns on the leeward half of the structure which are storing up the added compressive force are also endeavoring to spring the structure back to its normal vertical position. Thus in becoming restored to its normal vertical position with the wind subsiding, the structure will oscillate back and forth until wind induced forces and all forces in the columns on all sides become equalled out.

The operation of the circuitry herein is to inhibit both the extent of sway or oscillation and the rate of oscillation of the structure and particularly to keep the rate of oscillation imperceptible to the occupants. With rate of oscillation reduced to have the movement of the structure barely perceptible, if at all, to the occupants, the structure may be permitted to sway to a greater extent than otherwise. This allows further economies in the structural design.

Referring to FIG. 8, the operating circuitry A of FIG. 8, which is activated by the controller 70 in circuit with the sensors of said grid 60 by lines 71 includes a hydraulic pump 72 driven by an electric motor 74 having a line 74a to controller 70 and also included is a back up or reserve power source in the form of a motor generator 75. The hydraulic pump has a fluid line 95 to a reservoir 79. Said controller has a line 70a running to its primary power source.

Running from said pump to each respective cylinder is a fluid line 84 and intermediate said line is an electric hydraulic fluid metering valve 89 of which one will be described as a representative valve. Said valves are in circuit with said controller 70 by line 92.

FIG. 9 illustrates schematically a valve 89 and its operative relationship with the pump 72, a cylinder 40 and the controller 70. This is a conventional type of valve commonly known as an electro-proportional directional control valve.

Said valve 89 in being formed utilizes internal moving spool segments to open and close ports. Segment 89a provides flow from pump 72 to the inlet line 40a (FIG. 7) of the cylinder 40 to cause the piston rod 41 to retract and places the attached tendon under increased precomputed tension or if on the leeward half of a building structure, retraction of the piston rod would snub the tendon to constrain the reaction Of its adjacent deflected column in its tendency to spring back in an effort to resume a normally erect position.

The spool segment 89b is moved to shut off the supply line 84 to hold a desired degree of tendon elongation when it has been attained.

The spool segment 89c connects the pressurized supply from the pump line 84 to line 40b which forces the cylinder's piston rod to extend to relieve tendon tension. The pressure in line 94a to the counter balancing valve 116 aligns the discharge port 116b in the valve with line 40a allowing hydraulic fluid above the piston to flow through the spool segment 89c to the reservoir as the piston rod is being extended. The line 40d is a counter balancing line.

The spool segments of valve 89 are operated by the controller 70 through the valve control solenoid member 92a.

Included in the above described hydraulic fluid circuitry is a pressure relief solenoid valve 118 which is normally closed but will by-pass excessive pressure to protect the components of the system.

The return hydraulic line from the outlet of each cylinder of the hydraulic reservoir 79 is shown represented by line 94.

In connection with each cylinder to measure or determine its extension is the extensiometer such as 40c as shown with cylinder 40 in FIG. 7 and the same are in circuit with said controller by line 107.

Said motor 74 and motor generator 75 (FIG. 8) are respectively in circuit with said controller 70 by the lines 74a and 75a. Said motor has a line 74b running to a power source.

A windspeed indicator 110 is shown in circuit as an auxiliary element to indicate when the wind is sufficient to have the stabilizing system herein energized.

OPERATION

A full cycle of operation will be described. The lateral force bearing upon the structure will be presumed to be a wind force.

Referring first to the grid 60, with the structure free of any impact from wind force, the beam 62 will be focused normally upon the center square 60a of the grid. Each other square 60b has a light or energy cell to be energized by said beam upon being engaged by it. As noted in FIGS. 1, 2, and 8, under the impact of a wind force from the right or the East, the structure has become deflected to the West sufficiently to have the grid moved to have a sensor, indicated as 60c, become aligned with and engaged and activated by the beam 62. This sensor, as are all sensors of the grid, is in circuit with the controller 70. The controller in its data base has the location of each sensor in said grid as to its distance and direction from the location of the beam 62 and thus knows from the specific sensor activated, the extent, direction and rate of movement of the structure's deflection relative to the position of said beam. As will be appreciated, a simplified representation of said grid is shown here.

As a result of the deflection of the structure to the left, as viewed, the tendons 5–8 about the vertical column 14, representing all of the columns and tendons on the windward half of the structure, are being stretched to varying degrees with the deflection of the structure. At the same time, the columns on the leeward half of the structure are being put under increased compression from the building's deflection and are thereby reduced in length.

With the structure being thus deflected, when the wind force slackens, the structure will tend to swing back toward its usual erect position. The tendons and columns are likened to giant springs whereby when the wind abates, the stretched columns and tendons tend to retract to restore themselves. However, the columns tend to overreact because of the inertial forces and thus with the wind slackening, the structure oscillates in the process of settling down to a condition of equilibrium.

At the instant of the beginning of deflection of the structure, the controller actuates the hydraulic system and more particularly the cylinders on the windward half of the structure such as the cylinder 40. Depending upon the measured deflection, the controller calculates the distance that the cylinders shall retract their pistons to apply pre-computed tensile force into the tendons. The cylinders are located adjacent the column bases and as tensile forces are applied to said tendons, compressive forces become applied to the respective adjacent columns in what could be viewed as a leverage action in an effort to pull the column erect into the wind.

The extensiometers such as 40c of cylinder 40 indicate to the controller the exact extensions of the piston rods by the cylinders and thus the exact tensile forces being applied to the tendons by the retraction of the piston rods.

On the leeward half of the structure, the columns are under additional compression caused by the deflection of the structure and will spring back to their normal length or height as the wind abates.

As the controller senses the structure moving back to a position of reduced deflection as indicated to it by movement of the sensor grid 60, the leeward half tendons are stressed to slow the release of the increased compression loads on the leeward half columns.

Also when the structure is moving back to a position of reduced deflection, the controller slacks off the windward half tendons to various degrees to lessen their effect on pulling the structure back into an erect position.

With respect to the operation herein, for any given laterally deflected position of the structure, the changes of actual stress in the various structural members thereof can be precomputed. In a no-wind condition, all of the columns of the structure are in a compressive state and share the support of the dead load thereof. As the structure incurs lateral or wind loads, the upper portions of the structure start to deflect away from the wind and changes in the stress of the structural supports begin to occur.

The columns on the leeward half of the structure undergo additional compressive forces of various degrees and undergo a shortening which can be precomputed at various deflected positions of the structure. The columns on the windward portion or half of the structure undergo a reduction in compressive forces. The wind has a leverage advantage as its center of pressure which is far above the base of the structure from which the ultimate resisting force is obtained. Thus the large force changes occur in the lower column sections of the tubular structure here illustrated. This may vary with other types of structures.

It is not the degree of lateral movement or the extent of deflection of a structure which is particularly objectionable to the occupants of the structure but rather the objectionable elements are the rates of acceleration and deceleration which the structure incurs as it oscillates during its movement cycles. By retarding the movement of the structure and thus increasing the cycle time for each movement, the acceleration and deceleration rates are greatly reduced while at the same time allowing greater structural deflection, which in turn, allows a reduction in the amount of structural material to be added for the desired stiffness under current normal design concepts.

On a deflected structure, actual changes in length occur at different incremental rates of stress but cumulatively a net amount of change takes place. It is important to bear in mind, as has been said here, that a structure's columns are like tall springs which have an inherent urge to stretch out to their original length with a zero load, stress and strain condition.

The controller by causing the application of counteracting forces as described is programmed to inhibit the lateral deflection of the structure and inhibit the oscillation of the structure in restoring it to a state of equilibrium in a manner not to exceed typically accepted occupant comfort limits of acceleration and deceleration rates.

The tendons about the perimeter columns are caused by the controller to replace dead load compressive forces which are diminished by tensile forces on the windward half of the building structure and thus provide a force which endeavors to move the building structure back into the lateral deflecting force.

The tendons also act as a shock or energy absorber. On the leeward half of the structure the columns are undergoing increased compressive forces and incremental shortening. Because of the spring like nature of these columns, they will tend to spring back to normal length as quickly as permitted to do so by the action of the lateral force in subsiding.

By snubbing up the tendons adjacent to the columns on the leeward half of the structure by the use of the cylinders 40, and snubbing them further when the columns endeavor to spring back, the columns have to stretch the adjacent tendons and thus are effectively inhibited and oscillation of the structure is dampened as the columns and tendons become restored to a normal dead load condition. The controller can be programmed to apply additional force at the time the structure tries to move back to its normal position. The forces applied to the tendons by the action of the controller varies in accordance with the extent of deflection and the rate of movement of the structure.

By hydraulically controlling the reduction of forces applied in the tendons stressing system, by use of the proportional valve 89, the tendon stressing is utilized as a shock absorber on the leeward half of the structure and is conversely a tensioning structural reinforcing system on the windward half of the structure.

The input signals from the light sensing grid 60 signal the controller the exact deflected position of the structure at each given moment and the resultant changes in column stress can be precomputed at any given level and any corresponding change in length of any column can be precomputed for the degree of deflection. Thus there can be precomputed a corresponding set of counter forces to inhibit the deflection and oscillation of the structure and to initiate the different functions for the cylinders and pressure regulating valves to perform depending on the direction of the sway of the structure.

For each different degree and direction of deflection indicated by each grid sensor, a separate calculation is made by said controller 70 to determine the appropriate reinforcing loads to be induced into the structure by the action of the cylinders upon the tendons by appropriate extension or retraction of their respective pistons. There is computed a separate tensioning load for each column for each different degree of structural deflection. The controller in circuit with each cylinder regulates and achieves the desired force change to be induced at each cylinder location.

The control of the regulation force changes in the structure is described as follows.

For each desired force change into a stabilizing column, a desired load to be induced from the tendons is pre-calculated. Then a corresponding length of tendon stretch is determined. The stroke length of the piston of each cylinder is constantly monitored by the controller by appropriate means as by the use of the extensiometer, as here illustrated, which is embodied into each cylinder. Hence the force induced into the tendons at each column is controlled and the tensile forces applied to the tendons are cut off at the predetermined limits by the controller through the operation of the proportional valve 89, the operation of which is well known in the art.

Achieved herein is a very effective regulation and control of the deflection of a structure and its restoration to state of equilibrium by means of the live tendon system as described. The precise calculations indicated in the exercise of control are within the knowledge of the art and for each structure a program shall be calculated to be put into the data base of its controller 70.

The tendon system described herein with the accompanying arrangement of cylinders has been described as being vertically disposed. It is within the scope of this invention to have said tendons otherwise angularly disposed for the application of counter-acting forces in whatever direction may be required to stiffen support or bracing members of any lateral or wind force affected structure to resist deflection by force and to comfortably reestablish an equilibrium of forces within the structural elements.

Wind is the most obvious lateral force affecting tall structures, however the invention described applies to all lateral forces.

MODIFICATION

Referring to FIGS. 10-12, a modification is shown in which electric powered linear actuators as represented by the actuator 120 are used in lieu of the hydraulic cylinders above described. Previously described parts bear like reference numerals.

The linear actuator is an electric powered cylinder having a housing 125 and having therein an extensible or retractible rod 128 which is actuated by an attached electric motor 130 having a conventional linkage therebetween. Said rod is here shown operated by a screw 131 as indicated in FIG. 11, said screw being coupled to said motor. Said linear actuator is of a type produced by RACO INTERNATIONAL, Inc. of Bethel Park, PA., 15102. A suitable model of sid actuator for use herein is described as type C which is designed to have up to 200,000 lbs. of tension which is sufficient for purposes herein.

The actuator is mounted in the manner of the hydraulic cylinder 40 and is indicated as being secured to a suitably anchored base 58'.

Each of the actuators is connected with the tendons as described in connection with said hydraulic cylinders 40, however the linear actuators are not bulky to handle and require little supporting or operating equipment and thus, if desired, may be readily respectively connected to individual tendons for very precise control.

The actuator 120 will have its rod 128 suitably connected to tendon anchor plate member 150 in FIG. 11 with the rod 128 normally in an extended position. Said plate member is drilled to have tendons such as 3 and 4 extending therethrough and be secured by wedges 52 and 53 in the sockets 150a and 150b of said plate member. A line 135 connects the motor 130 to a power source not shown. A line 92 connects the actuator to the controller 70 and in circuit therewith is an extensiometer which is embodied within said actuator and not separately shown and which indicates the position of the rod 128. The controller will signal the actuator 120 to extend or retract its rod a specified distance and said line 136 will convey the signal and alert the controller when such movement has been accomplished.

Here electric transmission lines replace the complex hydraulic system first above described and greatly simplify the installation and operation of the control arrangement herein.

Other than the substitution of electronic for hydraulic transmission facilities, the operation of the modified structure is as that above described in connection with the hydraulic equipment.

The actuators and the attendant system of tendons may be installed at various locations and levels in a building structure in accordance with the placement of support and bracing members which may be both vertically and otherwise angularly disposed.

Referring to FIG. 12, which is not unlike FIG. 8 in purpose, a schematic is shown of the wiring in connection with the use of the electronic actuators 120.

Shown is a sensor grid 60 with the steady beam 62 and the beam source 61 in circuit by means of lines 71 with the controller 70.

As here shown, installed in connection with each perimeter supporting member, such as 12 or 14, is an actuator 120, the installation being in the manner described in connection with FIG. 11 with appropriate power lines 92 to each actuator and lines 136 to their respective extensiometers.

The specific wiring is obvious from what is shown and within the knowledge of wiring art.

Figure 13:
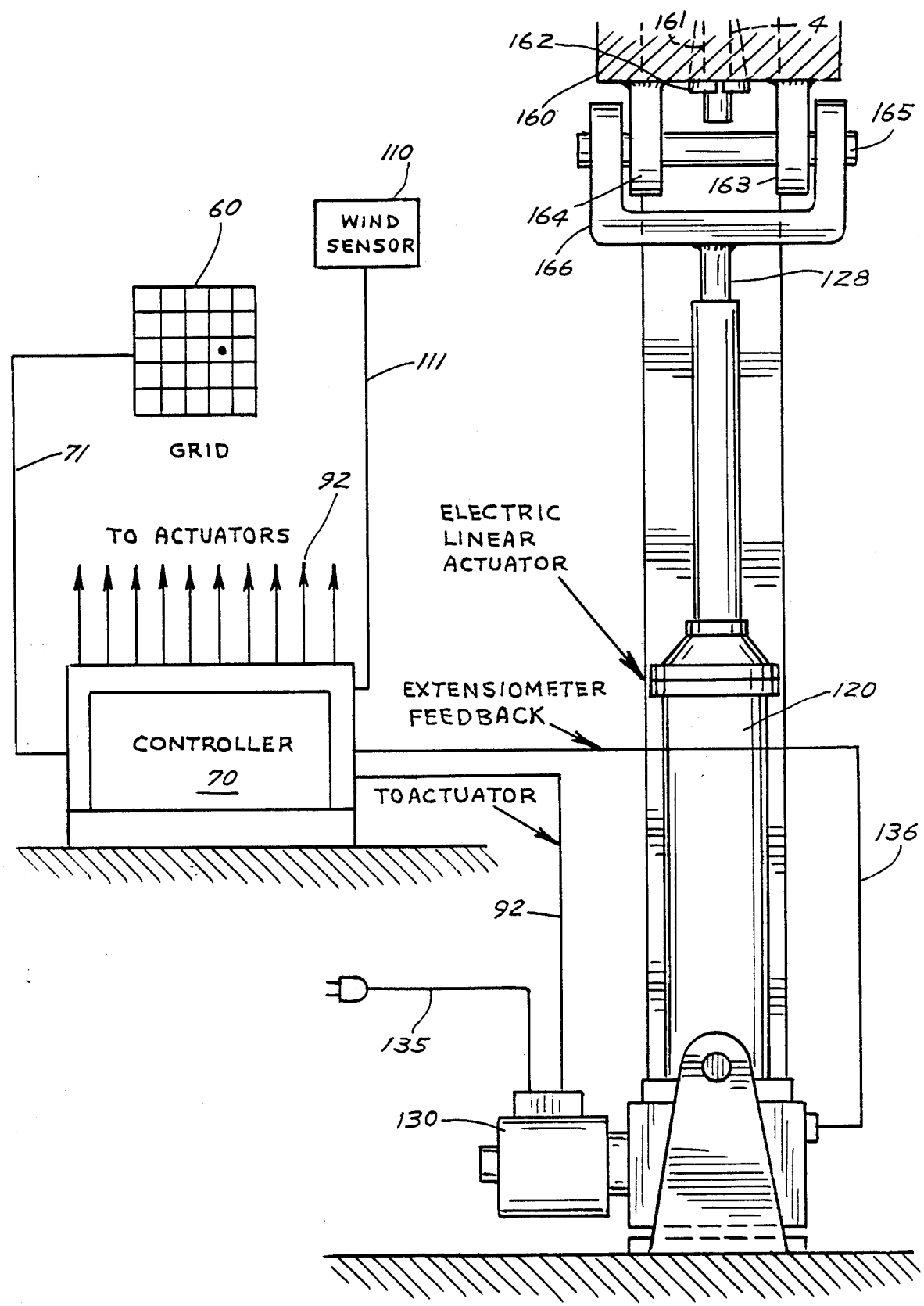
FIG. 13 is a schematic view of an enlarged scale of the operation of a representative electric valve.

Referring to FIG. 13, a modification of an application is shown in which the actuator 120 by means of its extensible rod 128 is secured to a single tendon 4. The connection to the tendon may be made in various ways. Illustrated is a block or anchor member 160 secured to adjacent the lower end of the tendons 4 by having the tendons extend through a passage 161 therein flared at its lower end to receive locking wedge members 162 and have a pair of depending ears 163 through which a pin 165 extends to be disposed through a yoke 166 secured as by welding to the adjacent end of the rod 128.

The operation is described in connection with FIG. 13. The controller 70 is individually in Circuit with each actuator by lines 136. In accordance with the extent of deflection of the structure, the controller is programmed to cause the actuators to apply tension to the appropriate tendons in a precise amount which is measured by the extensiometers embodied in each of the acutators. The extensiometer measure the extension of the rod 128. The controller knows what the precise extension of each tendon should be under a given lateral deflection applied to the structure and thus the rods 128 are extended under control to achieve a counter force to offset the lateral force applied and to inhibit the oscillation of the structure in re-establishing a condition of equilibrium when the force subsides in accordance with the description above given previously herein.

In the presently described structure, the columns represented by 12 and 14 are both stabilizing and supporting columns. In other structures, the stabilizing members may not be the supporting members and the tendon system herein will be applied to the stabilizing members. Within the above application the words stabilizing and supporting members are used inter-changeably.

MODIFICATION

Referring to FIGS. 14 and 15, another modification is shown which relates particularly to the sensing means for detecting and ascertaining the movement of the structure 10.

All parts previously described are indicated by the same reference numbers.

Shown in FIG. 14 is the structure 10 in skeleton or outline form having extended thereabove an appropriate mast head or antenna 200 which is rigid with the structure to move therewith and is referred to as a target. The structure is shown in an alternate moved position in dotted line as 10'. Said target is shown at the top of said structure but may be located elsewhere.

There is indicated at 206 a signal emitting and distance calculating measuring device which constantly measures the distance to said target by emitting an energized beam 207. Said target will have an appropriate reflective surface for the return of said beam to its source.

Said device 206 is at a point remote from said structure 10 and is stationary and immovable and is securely anchored to the earth in an appropriate manner.

There are commercially available several kinds of distance measuring devices generating an energized beam. For purpose of illustration herein, reference is made to a distance measuring apparatus such as produced by WILD HEERBRUGG, LTD. OF Heerbrugg, Switzerland which is known in the trade as DISTOMAT and of which one model 13000 projects an infrared beam. This is a timed pulse measuring device which for purposes herein may be such as up to a mile or even up to a distance such as eight miles remote from the targeted structure. The distance is measured by the time required for the beam to reach the target and return to its source. The distance variation is caused by the movement of the structure in swaying. With said device 206 located at a distance of one mile from the target, the extent of swaying of the structure can be measured accurately within one fourth of an inch. There is a constant measurement of the time interval for the beam 207 to reach its target and return and said device 206 being in circuit with the controller 70 constantly inputs its measurement data into said controller either by a wire 215 or by a wireless signal and the increments in difference of time measured are converted to a measurement of the distance of the sway of the structure.

With reference to Meckler (U.S. Pat. No. 3,796,017), he can only measure relative movement between members of his structure. He cannot measure movement of his structure from an absolute theoretical position relative to the earth by the use of a form of an energized beam as here indicated or such as a laser, maser or radar beam or radio waves and the like.

Shown is a second beam generating device 208 which is oriented 90° from said first device 206 whereby comparative directional readings can be taken to compute the movement of the structure in any direction. By the use of an appropriately positioned second target, not here shown an angular direction such as a twisting movement could be monitored. Said second device emits a beam 209.

Thus there is ascertained precise direction and extent of movement and also the rate of movement and its acceleration and deceleration at any given data collection interval.

Although the use of an energized beam generating device is known in other applications for distance measuring purposes, it is here utilized in a unique application to provide precise data regarding the sway movement of a tall structure and automatically inputting this data into the controller 70 which immediately, as hereinabove described, actuates the adjustment of tendons to counter whatever lateral force is causing the movement of the structure.

It is the actual change in horizontal dimension as ascertained by said devices 206 and 208 as an input to said controller which allows the controller to calculate both the direction and extent of movement of the structure and its rate of movement. The beams 207 and 209 need not be emitted horizontally as said controller can be programmed to calculate the horizontal component of any slope measurement.

In the alternate, the devices 206 and 208 may be mounted on the structure 10 and the target or targets 200 may be in a fixed position remote therefrom.

Thus there is provided an accurate continuously updated measurement of any movement as it occurs with an immediate automatic response on the part of the controller to counter the forces causing movement of the structure and to minimize the effects of the same in an expeditious and positive manner.

It will of course be understood that various changes may be made in form, details, arrangement and proportions of the product without departing from the scope of the invention herein which, generally stated, consists in an apparatus capable of carrying out the objects above set forth, in the parts and combination of parts disclosed and defined in the appended claims.

What is claimed is:

1. A live tendon automatically self operable control system inhibiting sway and oscillation in a structure deflected by a lateral force, having in combination
   a structure subject to deflection comprising a framework of stabilizing members,
   a plurality of elastic steel rod tendons extending along preselected of said stabilizing members,
   a programmed self operable controller,
   tensioning means operatively connected with said tendons and in circuit with and activated by said controller,
   sensing means in circuit with said controller indicating the deflection of said structure,
   said sensing means comprising a graduated grid of sensors,
   a steady beam focused upon the center of said grid,
   said sensing means being arranged and adapted to indicate to said controller a measured extent and direction of deflection of said structure relative to the position of said beam, whereby
   said sensing means causes said controller to activate said tensioning means to counter the effect of said lateral force in deflecting said structure.

2. The structure of claim 1 wherein
   said tensioning means comprises electronic activated cylinders having axially movable pistons respectively connected with one or more of said tendons.

3. The structure of claim 1, wherein
   said sensing means comprises a plurality of sensors in measured relationship with said beam movable relative thereto with the deflection of said structure,
   said sensors being engaged and activated respectively by said beam upon being moved into focus therewith, whereby
   said controller reads the respective positions of said sensors and determines the distance and direction of deflection of said structure.

4. The structure of claim 1, wherein
   said sensing means indicates the rate of deflection of said structure by their respective movements relative to said beam.

5. The structure of claim 1, wherein
   said control means causes, said tensioning means to apply tension to selected of said tendons on the windward side of said structure and to snub selected of said tendons on the leeward side of said structure.

6. The structure of claim 1, wherein
   said control means activates selected of said tensioning means to inhibit the sway of said structure as the lateral force slackens and thus slows the rate of oscillation of the structure in establishing an equilibrium in putting the inertial forces to rest.

7. The structure of claim 1, wherein
   said sensing means comprises a grid having spaced sensors in measured relationship, and
   said beam energizes said sensors focusing respectively thereon.

8. A live tendon automatically self operable control system measuring and inhibiting sway and oscillation of a structure deflected by a lateral force, having in combination
   a structure comprising a framework of stabilizing members,
   elastic steel rod tendons of which at least one extends along each of selected of said stabilizing members,
   an electronic programmed automatically operable controller,
   tensioning means operatively connected with said tendons and being in circuit with said controller,
   sensing means in circuit with said controller being in operative association with said structure sensing and indicating to said controller the extent and direction and rate of deflection of said structure,
   said controller responsive to said sensing means causing said tensioning means to act upon said tendons to counteract said lateral force,
   said sensing means comprising a beam from each of more than one fixed point origin directionally positioned about said structure to a point movable with said structure,
   said means constantly monitoring the changing distance between said points of origin and said point movable with said structure calculating the change in distance and rate of change relative to each point of origin.

9. The structure of claim 8, wherein
   said controller responsively activates said tensioning means to cause selected of said tendons to inhibit the sway of said structure as the lateral force slackens and to slow the rate of oscillation of the structure in establishing an equilibrium in putting inertial forces to rest.

10. The structure of claim 8, wherein said controller means causes said tensioning means to retard the increase of tensile forces in selected of said stabilizing members and to retard the rate of loss of compressive forces in other selected of said stabilizing members whose resultant change in length affects th of said structure.

11. The structure of claim 8, wherein
said controller means causes said tensioning means to retard the increase of tensile forces in selected of said stabilizing members.

12. The structure of claim 8, wherein
said controller means causes said tensioning means to retard the rate of loss of compressive forces in selected of said stabilizing members whose resultant change in length affects the sway of said structure.

13. A method of inhibiting the deflection and sway of a structure caused by a lateral force, consisting of the steps
   a. extending elastic steel rods along stabilizing members of a structure,
   b. automatically sensing a measured extent and direction of deflection of said structure caused by said lateral force.
   c. automatically inducing into selected of said rods a measured force counteracting the lateral force deflecting the structure,
   d. automatically snubbing selected of said rods restraining the release of the added tensile forces imposed upon said stabilizing members by the deflection of said structure, and
   e. automatically modifying said forces induced into said rods as said lateral force slackens and the inertial forces in the structure act to come into equilibrium.

14. A live tendon automatically self operable control system measuring and inhibiting sway and oscillation of a structure deflected by a lateral force, having in combination
   a structure comprising a framework of stabilizing members,
   elastic steel rod tendons of which at least one extends along each of selected of said stabilizing members,
   an electronic programmed automatically operable controller,
   tensioning means operatively connected with said tendons and being in circuit with said controller,
   sensing means in circuit with said controller being in operative association with said structure sensing and indicating to said controller the extent and direction and rate of deflection of said structure,
   said controller responsive to said sensing means causing said tensioning means to act upon said tendons to counteract said lateral force,
   said sensing means comprising at least one target for an energized beam, said target being rigid and movable with said structure and a stationary energized beam emitting means remote from said structure emitting on energized beam to said target,
   said beam emitting means measuring the distance to said target by the measurement of the time of the passage of said beam to said target and its return,
   said beam emitting means being in circuit with said controller inputting said distance measurement as data to said controller, and
   said controller being activated to cause said tensioning means to act upon said tendons to stabilize the structure.

15. A live tendon automatically self operable control system measuring the inhibiting sway and oscillation of a structure deflected by a lateral force, having in combination
   a structure comprising a framework of stabilizing members,
   elastic steel rod tendons of which at lest one extends along each of selected of said stabilizing members, operable controller,
   tensioning means operatively connected with said tendons and being in circuit with said controller,
   sensing means in circuit with said controller being in operative association with said structure sensing and indicating to said controller the extent and direction and rate of deflection of said structure,
   said controller responsive to said sensing means causing said tensioning means to act upon said tendons to counteract said lateral force,
   said sensing means comprising a target for an energized beam, said target being rigid with and movable with said structure and a pair of energized beam emitting devices being oriented approximately ninety degrees apart, each directing a beam to said target, said beams being oriented in directions on the order of approximately ninety degrees apart,
   the passage time of each of said beams from their respective emitters to said target and return to their respective emitters being calculated by said respective emitters,
   said devices respectively being in circuit with said controller inputting measurement time of the passage of said beam converted into distance measurement whereby variations in distance measurements cause said controller to activate the tensioning means to stabilize said structure.

16. A live tendon automatically self operable control system measuring and inhibiting away and oscillation of a structure deflected by a lateral force, having in combination
   a structure comprising a framework of stabilizing frame members,
   elastic steel rod tendons of which at least one extends along each of selected of said stabilizing members,
   an electronic programmed automatically operable controller,
   tensioning means in circuit with said controller and operatively connected with said tendons to cause the same to restore said structure to its original erect position in countering deflection by a lateral force,
   sensing means in circuit with said controller being in operative association with said structure sensing and indicating to said controller the measured extent and direction and rate of deflection of said structure by said lateral force, and
   said controller responsive to said sensing means causing said tensioning means to act upon said tendons the precise extent indicated by said sensing means to counteract said lateral force.

* * * * *

UNITED STATES PATENT AND TRADEMARK OFFICE
CERTIFICATE OF CORRECTION

PATENT NO. : 4,956,947

DATED : September 18, 1990

INVENTOR(S) : Leonard R. Middleton

It is certified that error appears in the above-identified patent and that said Letters Patent is hereby corrected as shown below:

On the title page item [76]:

The patentee's name is corrected to be Leonard R. Middleton.

In column one, line 17, the word "stores" should be corrected to be "stories".

Signed and Sealed this

Third Day of September, 1991

Attest:

HARRY F. MANBECK, JR.

Attesting Officer

Commissioner of Patents and Trademarks